(12) United States Patent
Nielsen et al.

(10) Patent No.: US 11,698,214 B2
(45) Date of Patent: Jul. 11, 2023

(54) SCALE LOCK

(71) Applicant: Robert Bosch GmbH, Stuttgart (DE)

(72) Inventors: Josh Nielsen, Prior Lake, MN (US); Benjamin Borton, Richfield, MN (US)

(73) Assignees: Bosch Automotive Service Solutions Inc., Warren (ML); Robert Bosch GmbH, Stuttgart (DE)

( * ) Notice: Subject to any disclaimer, the term of this patent is extended or adjusted under 35 U.S.C. 154(b) by 250 days.

(21) Appl. No.: 17/130,707

(22) Filed: Dec. 22, 2020

(65) Prior Publication Data

US 2022/0196303 A1    Jun. 23, 2022

(51) Int. Cl.
*F25B 49/00* (2006.01)
*F25B 45/00* (2006.01)
*G01G 5/00* (2006.01)
*G01G 23/00* (2006.01)

(52) U.S. Cl.
CPC ............ *F25B 49/005* (2013.01); *F25B 45/00* (2013.01); *G01G 5/003* (2013.01); *G01G 23/00* (2013.01)

(58) Field of Classification Search
CPC .................................................. G01G 23/00
See application file for complete search history.

(56) References Cited

U.S. PATENT DOCUMENTS

| | | | | |
|---|---|---|---|---|
| 5,032,045 A | * | 7/1991 | Calco | E05C 1/04 292/61 |
| 5,481,071 A | * | 1/1996 | Wojnarski | G01G 23/00 73/1.13 |
| 6,823,965 B2 | * | 11/2004 | Stringer | E04G 7/305 182/118 |
| 2019/0039759 A1 | * | 2/2019 | Govekar | F25B 45/00 |
| 2022/0283017 A1 | * | 9/2022 | Connolly | G01G 21/28 |

* cited by examiner

*Primary Examiner* — Natalie Huls
(74) *Attorney, Agent, or Firm* — Kathy Takeguchi; Maginot, Moore & Beck LLP (57) ABSTRACT

A lock assembly includes at least a lock component, a lock member, and a bracket. The lock component is securable to a load cell. The lock member is configured to move into a first position to provide an unlocked state in which the lock member is disengaged from the lock component. In the unlocked state, the load cell is physically unsecured from the lock member and enabled to operate. The lock member is configured to move into a second position to provide a locked state in which the lock member is engaged with the lock component. In the locked state, the load cell is physically secured to the lock member via the lock component. The bracket is configured to support the lock member in relation to the lock component.

18 Claims, 8 Drawing Sheets

SCALE LOCK

FIELD

This disclosure relates generally to locking mechanisms, and more specifically to locking mechanisms that are configured for load cells.

BACKGROUND

In general, there has been an interest in transporting service carts to various job sites via service vehicles. However, there are some service carts, which include components that may be prone to damage when transported by service vehicles. For example, an air conditioning service (ACS) unit includes a load cell, which is susceptible to damage when subjected to vibrations and/or the like that may occur when being transported via a service vehicle. This damage may result in a loss of the integrity and a loss of the accuracy in the measurements provided by the load cell.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a lock assembly relates to a load cell. The lock assembly includes at least a lock component, a lock member, and a bracket. The lock component is securable to the load cell. The lock member is configured to be located at least a first position such that the lock member is disengaged from the lock component to provide an unlocked state. In the unlocked state, the load cell is unsecured from the lock member. The lock member is configured to be located at a second position such that the lock member is engaged with the lock component to provide a locked state. In the locked state, the load cell is secured to the lock member. The bracket is configured to support the lock member in relation to the lock component.

According to at least one aspect, a mobile service unit includes a base, a load cell, and a lock assembly. The load cell is supported on the base. The lock assembly includes a lock component, a lock member, and a bracket. The lock component is securable to the load cell. The lock member is configured to be located at a first position such that the lock member is disengaged from the lock component to provide the unlocked state. In the unlocked state, the load cell is unsecured from the lock member. The lock member is configured to be located at a second position such that the lock member is engaged with the lock component to provide the locked state. In the locked state, the load cell is secured to the lock member. The bracket is secured to the base. The bracket is structured to support the lock member in relation to the lock component.

According to at least one aspect, a mobile service unit includes at least a base, a load cell, and a lock assembly. The load cell is supported on the base. The lock assembly is configured to selectively provide an unlocked state of the load cell and a locked state of the load cell. The lock assembly includes at least a lock member, a bracket, an electrical switch, and an actuator. The lock member is configured to move between at least (i) a first position to provide the unlocked state and (ii) a second position to provide the locked state. The bracket is secured to the base. The bracket is configured to support the lock member. The electrical switch is secured to the bracket. When activated, the electrical switch is configured to provide power to the load cell. When deactivated, the electrical switch is configured to disconnect power from the load cell. The actuator is configured to activate the electrical switch when the lock assembly is in the unlocked state. The actuator is also configured to deactivate the electrical switch when the lock assembly is in the locked state.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives failing with the spirit and scope of this disclosure.

Figure 1:
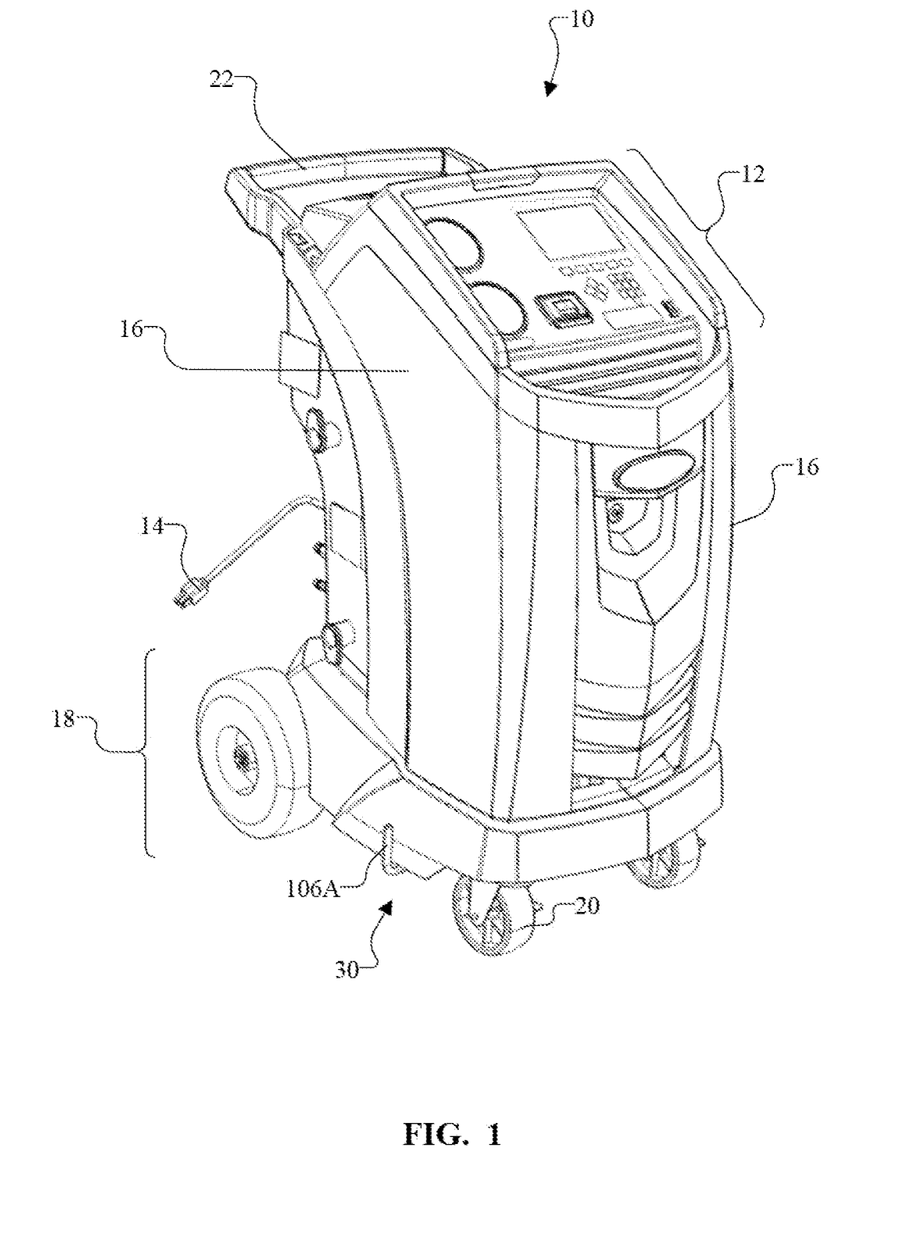
FIG. 1 is a perspective view of an example of a mobile service unit with a scale lock according to an example embodiment of this disclosure.
Figure 2:
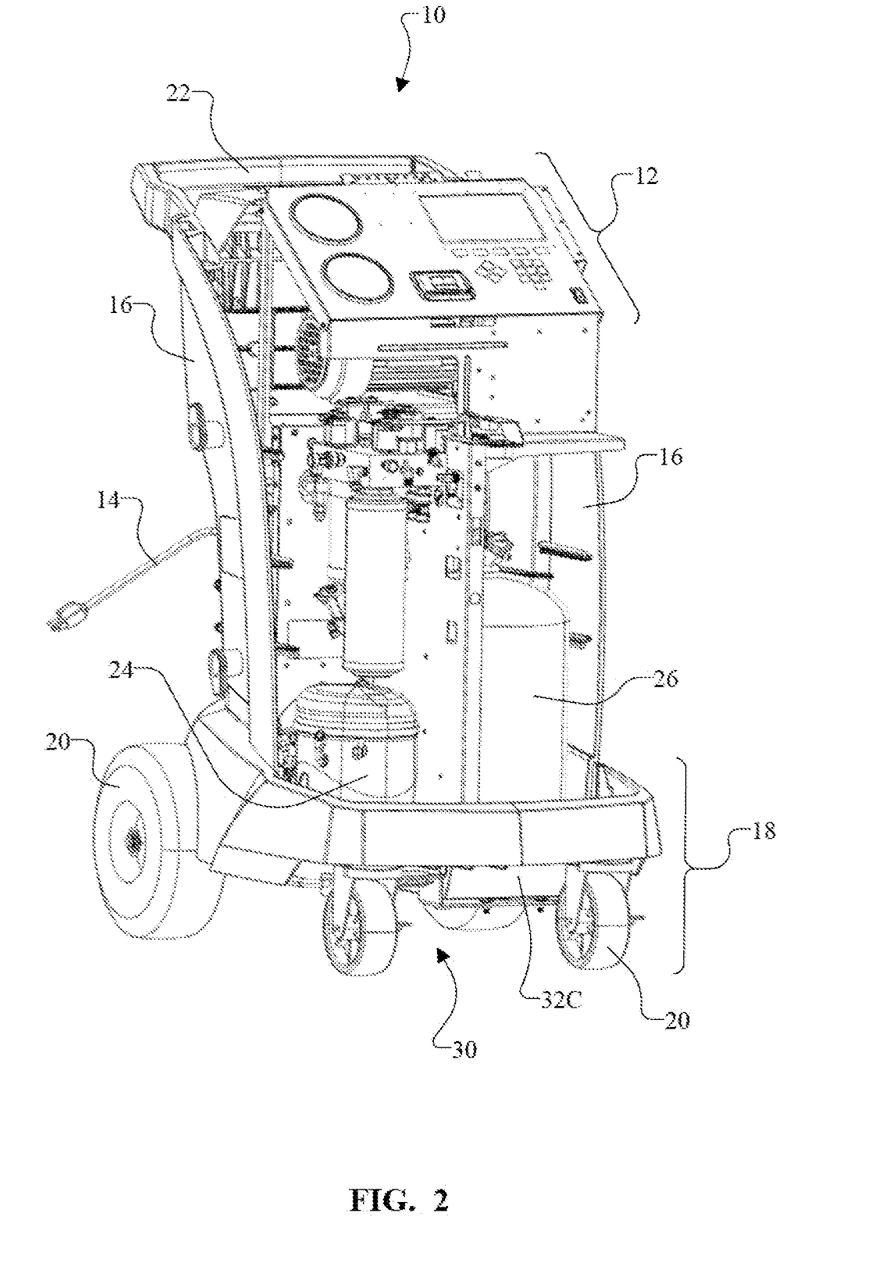
FIG. 2 is a perspective view of the mobile service unit and the scale lock of FIG. 1 in which a front panel has been removed to show an interior portion of the mobile service unit according to an example embodiment of this disclosure.

FIGS. 1-2 illustrate different views of a mobile service unit according to an example embodiment. The mobile service unit may be any suitable servicing unit that includes a load cell 34 or any similar device. For example, in FIG. 1, the mobile service unit is an ACS unit 10. The ACS unit 10 includes a recover, recycle, and recharge machine, which is configured for use with at least one air conditioning system. For instance, in FIG. 1, the machine is a single-pass system (i.e. refrigerant flows through a filter once) for recycled refrigerant. The ACS unit 10 includes a control panel 12, which includes an electronic control system that enables a user to control operations of the machine while also enabling a user to receive various metrics and relevant information. The ACS unit 10 includes a power cord 14 to connect the machine to a power source so that the machine is electrically enabled to perform various electrical, electronic, and/or computer operations based at least on inputs received from the control panel 12.

The ACS unit 10 is configured as a mobile machine that is enabled to move along surfaces. For example, as shown in FIGS. 1-2, the ACS unit 10 includes a housing 16, which is supported by a base assembly 18 with wheels 20 that enable the ACS unit 10 to move. In addition, the ACS unit 10 includes a steering handle 22, which extends outward from the housing 16 and provides a suitable grip that enables the ACS unit 10 to be pushed and/or pulled to a desired location with ease. In general, as shown in FIG. 2, the housing 16 is structured to house various components of the ACS unit 10, such as a compressor 24, a storage tank 26, and a scale assembly 28 (FIG. 3), as well as various other electrical/electronic components (e.g. display, memory device, I/O device, etc.), pumps, bottles, hoses, and other components relating to servicing an air conditioning system. In FIG. 2, the housing 16 houses the compressor 24 on one side of the base assembly 18 and the storage tank 26 on an opposite side of the base assembly 18. The compressor 24 is operably connected to the storage tank 26. The storage tank 26 is configured to store or contain any suitable substance, mixture, or matter. For example, in FIG. 2, the storage tank 26 is configured to include refrigerant. The storage tank 26 is configured to be received and disposed on the scale assembly 28, which is supported by the base assembly 18.

Figure 3:
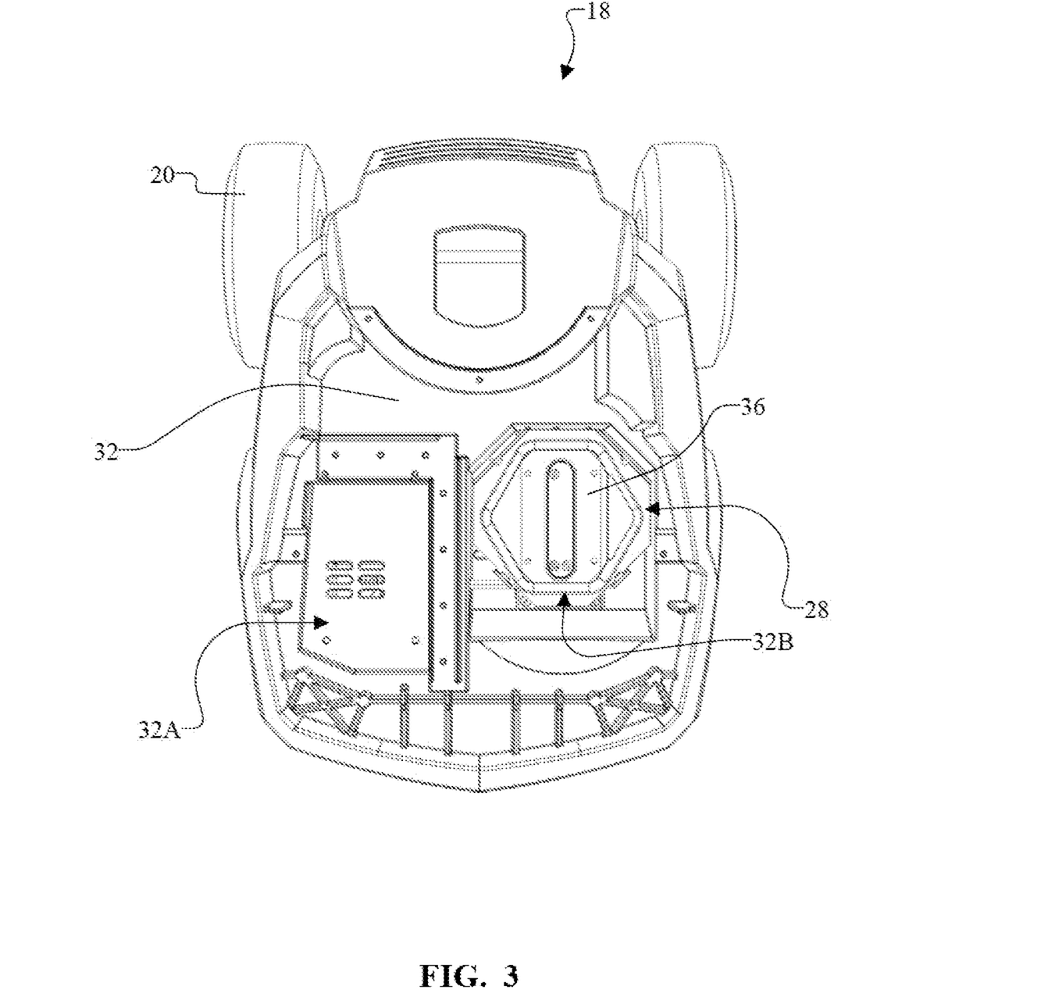
FIG. 3 is a top plan view of the scale assembly that is disposed within the base assembly of the mobile service unit of FIG. 1 according to an example embodiment of this disclosure.
Figure 4A:
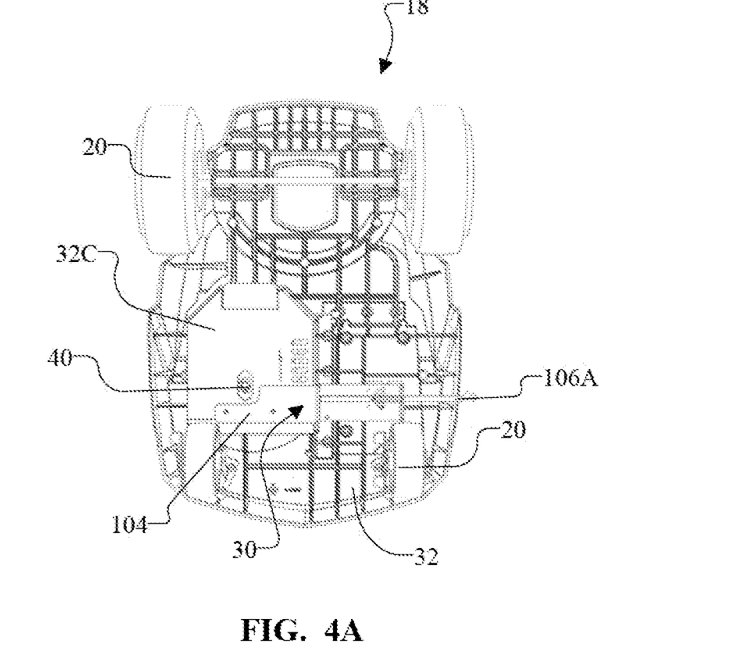
FIG. 4A is a bottom plan view of the base assembly with the scale lock in an unlocked state according to an example embodiment of this disclosure.
Figure 4B:
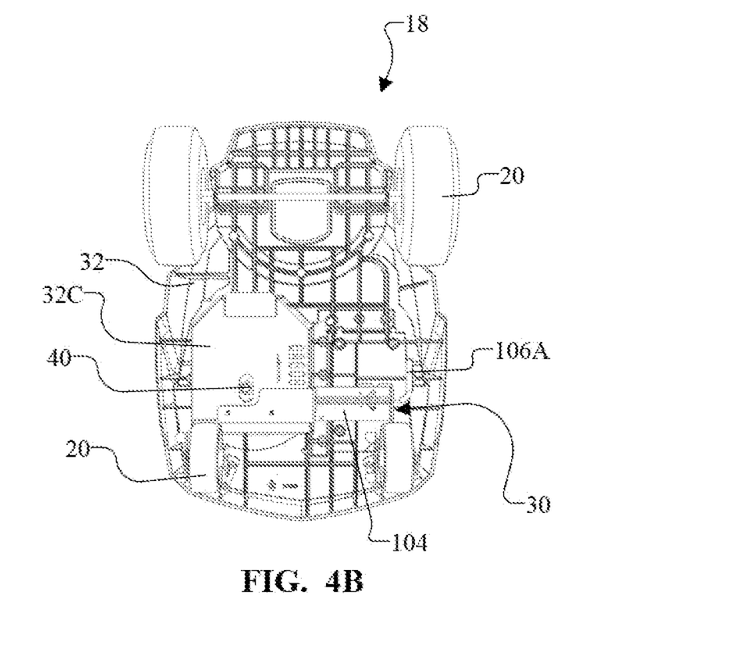
FIG. 4B is a bottom plan view of the base assembly with the scale lock in the locked state according to an example embodiment of this disclosure.

FIG. 3 and FIGS. 4A-4B show different views of the base assembly 18 with respect to the scale assembly 28 according to an example embodiment. More specifically, FIG. 3 shows a top view of the base assembly 18. The base assembly 18 includes a base 32 having a spot 32A for the compressor 24 to reside thereon and a spot 32B for the storage tank 26 and scale assembly 28 to reside thereon. As shown in FIGS. 2-3, the base assembly 18 supports at least the compressor 24 on one side of the base 32 and the storage tank 26 together with the scale assembly 28 on an opposite side of the base 32. In this regard, the scale assembly 28 is configured to sense a weight of the storage tank 26. By providing the weight measurement of the storage tank 26, the ACS unit 10 is configured to determine how much refrigerant is in the storage tank 26. This feature is advantageous in enabling the ACS unit 10 to provide an indication on the control panel 12 that lets the user know how much refrigerant has been charged or recovered at a given instance or time period, such as during service. The scale assembly 28 is operatively connected to the electronic control system. The scale assembly 28 and the electronic control system are configured to electrically connect to the power source, which provides power to various electronic components of the ACS unit 10. In addition, the scale assembly 28 is configured to interact with a scale lock 30.

FIGS. 4A and 4B show the scale lock 30, which is disposed on an underside of the base 32 of the base assembly 18. In particular, FIG. 4A illustrates a bottom plan view of the scale lock 30 in the unlocked state while FIG. 4B illustrates a bottom plan view of the scale lock 30 in the locked state. As shown in FIGS. 4A and 4B, the scale lock 30 is configured to be secured to the base 32. The base 32 may include a protruding portion 32C, which protrudes outward from a surface of the base 32, as shown in FIG. 2. In this example, the protruding portion 32C is structured to support at least the scale assembly 28. The protruding portion 32C has a surface with a through-hole for the magnet mount 40. In this regard, as shown in FIGS. 4A-4B, the scale lock 30 includes a first portion, which overlaps a region of the base 32 that corresponds at least partly to the spot 32A for compressor 24, and a second portion, which overlaps a region of the base 32 that corresponds at least partly to the spot 32B for the storage tank 26 and the scale assembly 28.

FIGS. 5A-5B and FIGS. 6A-6B illustrate different views of the scale assembly 28 with respect to a scale lock 30. The scale assembly 28 is configured to provide a weight measurement of an object, such as the storage tank 26, when received thereon. In an example embodiment, the scale assembly 28 includes at least a load cell 34, a scale platform 36, a scale base 38, and a magnet mount 40. For instance, in FIGS. 5A and 5B, the load cell 34 is a beam load cell. The scale platform 36 is connected to the load cell 34. The scale platform 36 is configured to receive an object that is to be sensed by the load cell 34. In this regard, for example, the scale platform 36 is a tray, which is structured to receive and support the storage tank 26. The scale assembly 28 further includes a scale base 38. In this example, the scale base 38 is a three-sided structure, which includes a wall portion 38A, which is between a first sidewall 38B and a second sidewall 38C. The scale base 38 surrounds and protects three sides (e.g., bottom surface and side surfaces) of the load cell 34 while a fourth side (e.g., top surface) of the load cell 34 includes the scale platform 36. In addition, the first sidewall 38B and the second sidewall 38C are configured to serve as additional contact points for the scale lock 30 by the further including through-holes therein to receive the lock member 106. Also, the magnet mount 40 is used for setting a calibration weight thereon to calibrate the scale assembly 28.

Figure 5A:
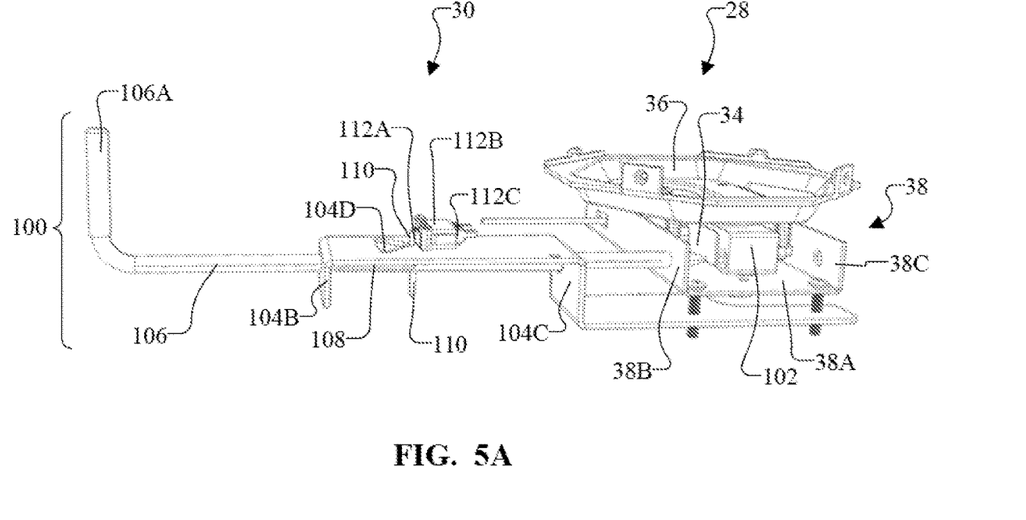
FIG. 5A is a perspective view of the scale assembly with the scale lock in the unlocked state according to an example embodiment of this disclosure.
Figure 5B:
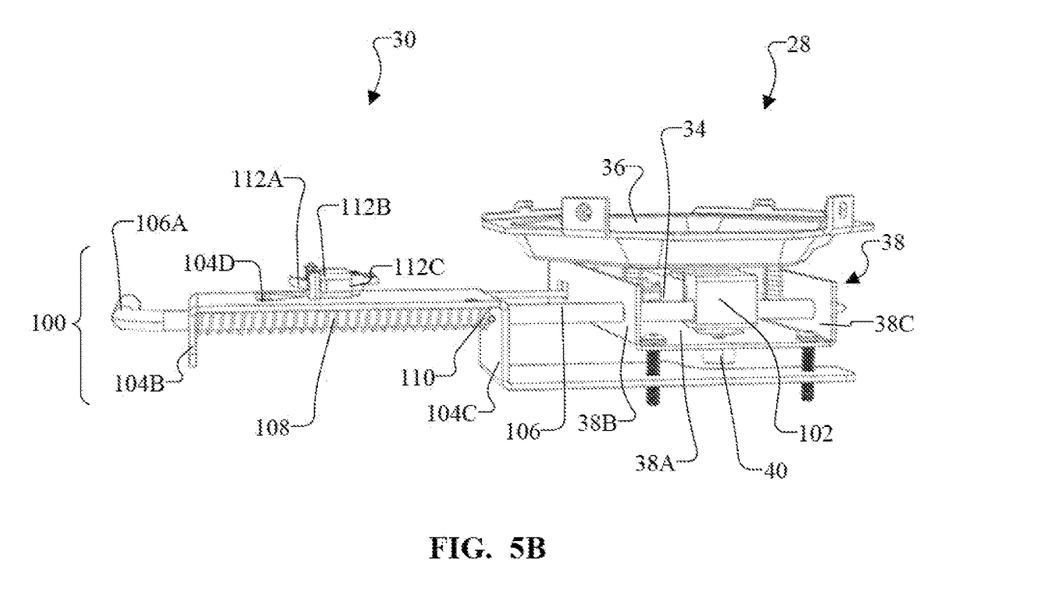
FIG. 5B is a perspective view of the scale assembly with the scale lock in the locked state according to an example embodiment of this disclosure.

Also, FIGS. 5A-5B and 6A-6B show the scale lock 30, which is configured to interact with the scale assembly 28. The scale lock 30 includes a lock assembly 100, which is configured to provide at least a three point locking mechanism. The lock assembly 100 is configured to provide an unlocked state in which the load cell 34 is physically unsecured by the three point locking mechanism as shown in FIG. 5A and a locked state in which the load cell 34 is physically secured by the three point locking mechanism as shown in FIG. 5B. In addition, the lock assembly 100 is configured to operably connect the load cell 34 to at least an interlock relay and/or an electronic control board of the ACS unit 10 when in the unlocked state and disconnect the load cell 34 from at least the interlock relay and/or the electronic control board of the ACS unit 10 when in the locked state. More specifically, when the lock assembly 100 is in the unlocked state with the scale assembly 28, then the ACS unit 10 is configured to turn on and provide power to its electrical/electronic components (including the load cell 34) in a normal manner. In this regard, when the lock assembly 100 is in the unlocked state with the scale assembly 28, then the load cell 34 is configured to obtain power via the power source of the ACS unit 10. Alternatively, when the lock assembly 100 is in the locked state with the scale assembly 28, then the ACS unit 10 is configured to turn off and cut power to its electrical/electronic components (including the load cell 34) to protect them. In this regard, the load cell 34 is disconnected from obtaining power via the power source of the ACS unit 10 when the lock assembly 100 is in the locked state with the scale assembly 28. Accordingly, the lock assembly 100 is advantageously configured to provide a relatively easy and convenient means by which the load cell 34 may be secured and protected as desired by the user such as during those times when the scale assembly 28 would be vulnerable to damage (e.g., as during transport in a vehicle, during an earthquake, etc.).

Figure 7:
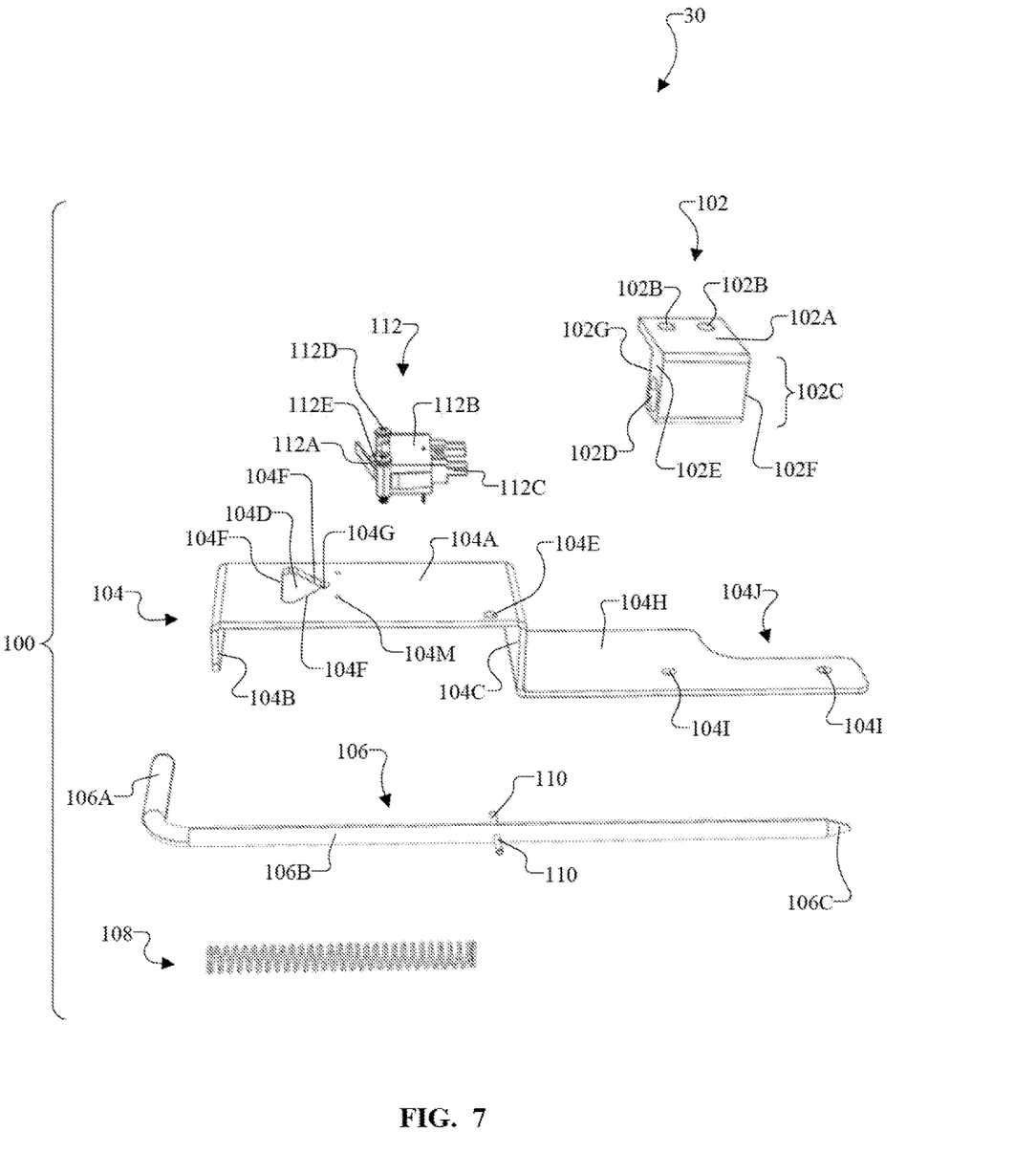
FIG. 7 is an exploded view of the scale lock according to an example embodiment of this disclosure.

FIG. 7 shows an exploded view of the scale lock 30 according to an example embodiment. As shown in FIG. 7, the scale lock 30 includes at least the lock assembly 100. The lock assembly 100 includes at least a lock component 102, a bracket 104, a lock member 106, a spring 108, a pin 110, and an electrical switch 112. The lock component 102 is connected directly to the scale assembly 28. More specifically, for instance, the lock component 102 is securable to the load cell 34. In an example embodiment, the lock component 102 is structured as an extension of the load cell 34. The lock component 102 provides the load cell 34 with a structure that the lock member 106 can interact with to secure the load cell 34 when in the locked state and unsecure the load cell 34 when in the unlocked state. For example, in FIG. 7, the lock component 102 includes a first connection portion and a second connection portion.

The first connection portion and the second connection portion are structured in an L-shape or substantially L-shape configuration to be positioned over a corner portion of the load cell 34. The first connection portion includes a flange 102A. The flange 102A includes a number of through-holes 102B to receive a number of mechanical fasteners, which fasten the lock component 102 to the scale assembly 28. For example, as shown in FIGS. 5A and 5B, the flange 102A is structured to reside between a top surface of the load cell 34 and a bottom surface of the scale platform 36. The mechanical fasteners fasten the lock component 102 to the load cell 34. The mechanical fasteners may also be used to fasten the lock component 102 to the scale platform 36. As shown in FIG. 7, the flange 102A is configured to protrude outward from a surface of the second connection portion.

The second connection portion comprises a body 102C with a through-hole 102D that extends from one end surface 102E to an opposite end surface 102F. In this regard, the lock member 106 is configured to move into the body 102C to provide the locked state and move out of the body 102C to provide the unlocked state. The body 102C includes any suitable shape. For example, in FIG. 7, the body 102C is a block or block-like structure, which is structured as a corresponding extension of the load cell 34. The body 102C has an end surface 102G that faces and contacts an end surface of the load cell 34.

The bracket 104 is securable to the base 32. The bracket 104 is configured to provide support to various components of the lock assembly 100 with respect to the base 32 so that these components are positioned to interact with the scale assembly 28. For example, the bracket 104 is configured to provide support to the lock member 106 in relation to the lock component 102. The bracket 104 is also configured to support the actuator 112A and the electrical switch 112. In addition, the bracket 104 includes a lock structure (inner walls 104F and through-hole 104D), which is configured to receive and engage with the pin 110 such that the lock member 106 is configured to be held in the unlocked state and prevented from moving towards the lock component 102. The bracket 104 is also configured to define at least one physical bound in which the lock member 106, the spring 108, and/or the pin 110 can travel.

In FIG. 7, the bracket 104 is a monolithic structure. Alternatively, the bracket 104 may comprise a number of parts that are securely connected to each other to form a united structure. In addition, the bracket 104 comprises a rigid material. For example, the bracket 104 comprises any suitable metal, alloy, or material. As an example, in FIG. 7, the bracket 104 comprises steel, which may be further processed and/or include a protective coating. The bracket 104 includes at least a first portion and a second portion.

The first portion includes a first wall 104A, which is disposed between a first sidewall 104B and a second sidewall 104C. The first wall 104A is configured to support the electrical switch 112. The electrical switch 112 is configured to be disposed on a first surface of the first wall 104A of the bracket 104. The electrical switch 112 is also configured to be secured to the first wall 104A via at least one mechanical fastener. The bracket 104 enables the electrical switch 112 to be positioned in a vicinity of other electronic components (e.g., wires) of the ACS unit 10 while also positioning the electrical switch 112 out of the pathway of the lock member 106 and the lock component 102. The first wall 104A is also configured to provide a physical barrier that protects the electrical switch 112 from the moving components of the lock assembly 100. The first wall 104A also serves as a physical barrier that is configured to protect the electrical switch 112 from foreign particles, which, as a non-limiting example, may arise as the ACS unit 10 moves along a surface via its wheels 20. The first wall 104A is also configured to provide a protective barrier for the lock member 106, the pin 110, and the spring 108 with respect to the base 32 of the ACS unit 10. The first wall 104A is also securable to a part of the base 32. In this regard, for example, the first wall 104A is configured to include at least one through-hole 104E to receive a fastener to fasten the first wall 104A to the corresponding part of the base 32.

In addition, the first wall 104A is structured to include the lock structure, which is defined at least by the inner walls 104F and the through-hole 104D of the bracket 104. The pin 110 is configured to engage with the lock structure so that the lock member 106 is held in the first position and the lock assembly 100 is held in the unlocked state. The pin 110 is also configured to disengage from the lock structure so that the lock member 106 is configured to move. More specifically, as shown in FIG. 7, the first wall 104A has inner walls 104F that define the through-hole 104D. In plan view, the inner walls 104F comprise a shape such that there is a larger region to receive the pin 110 in any orientation and a smaller region to hold the pin 110 in a vertical orientation. In plan view, the inner walls 104F are configured to comprise a shape such that there is a transition region between the larger region and the smaller region, whereby the larger region is greater than the smaller region. The inner walls 104F at the transition region provide a smooth transition between the larger region and the smaller region. At the transition region, the inner walls 104F are configured to guide the pin 110 towards a vertical orientation as the lock member 106 transitions into the first position. For example, in FIG. 7, the inner walls 104F comprise a triangular shape in plan view. Each corner of the triangle may be rounded off to prevent the pin 110 from getting stuck therein. For example, in FIG. 7, a corner portion at the smaller region includes inner walls 104F that have a round portion that define a slot 104G for holding the pin 110 in the vertical orientation. The pin 110 is configured to be held against the inner wall portion of the slot 104G when the lock member 106 is in the first position and the lock assembly 100 is in the unlocked state.

The second portion includes a second wall 104H. The second wall 104H is structured to provide the bracket 104 with added support and a secure connection to the base 32. In this regard, the second wall 104H is securable to the base 32. For example, in FIG. 7, the second wall 104H includes through-holes 104I, which are configured to receive fasteners that secure the bracket 104 onto a portion of the base 32 that corresponds to the location of the scale assembly 28. Also, in this example, as shown in at least FIG. 7, the second wall 104H includes at least one cutaway portion to provide sufficient clearance for at least one other component of the base 32. For instance, as shown in FIGS. 4A and 4B, the second wall 104H includes a cutaway portion 104J so that the bracket 104 does not interfere with the magnet mount 40.

In this example, the second wall 104H resides on a different plane than the first wall 104A to accommodate a protruding portion 32C (FIG. 2) of the base 32. The protruding portion 32C extends further outward from the base 32 than that portion of the base 32 that corresponds to the first wall 104A. In this case, the protruding portion 32C is structured to contain at least the scale assembly 28. In this regard, the second wall 104H, the second sidewall 104C, and the first wall 104A form a step-like structure, thereby conforming to a periphery of the base 32 to provide a secure connection. The bracket 104 is not limited to this configuration, as the second wall 104H may be provided on a same plane as the first wall 104A provided that the second wall 104H allows for a secure connection to the base 32 and does not interfere with other components.

In addition, the bracket 104 is configured to include a first sidewall 104B and a second sidewall 104C. More specifically, the first sidewall 104B extends perpendicular or substantially perpendicular to the first wall 104A. The second sidewall 104C extends perpendicular or substantially perpendicular to the first wall 104A. Also, the first sidewall 104B is disposed at one end of the first wall 104A while the second sidewall 104C is disposed at an opposite end of the first wall 104A. As shown in FIG. 7, the first sidewall 104B is spaced from the second sidewall 104C by a length of the first wall 104A.

The first sidewall 104B and the second sidewall 104C are structured to support and align the lock member 106 with respect to the lock component 102 on the load cell 34. In this regard, the first sidewall 104B includes a through-hole 104K (FIG. 6A) to receive the lock member 106 with sufficient clearance to enable the lock member 106 to move. The second sidewall 104C includes a through-hole 104L (FIG. 6A) to receive the lock member 106 with sufficient clearance to enable the lock member 106 to move. In addition, the first sidewall 104B and the second sidewall 104C have their through-holes 104K and 104L aligned to receive the lock member 106. Also, the first sidewall 104B and the second sidewall 104C are configured to provide physical bounds that limit the movement of components of the lock assembly 100. For example, the first sidewall 104B provides a physical bound for the spring 108. Also, the second sidewall 104C provides a physical bound for the pin 110.

The lock member 106 includes a handle portion 106A and a shaft portion 106B. For example, in FIG. 7, the lock member 106 is L-shaped or substantially L-shaped with the handle portion 106A extending perpendicular or substantially perpendicular to the shaft portion 106B. The lock member 106 is a monolithic structure. Alternatively, the lock member 106 may comprise a plurality of parts, which are securely connected to each other to form a united structure. The lock member 106 comprises a rigid and strong material, such as a metal, an alloy, or any suitable composition. For example, in FIG. 7, the lock member 106 comprises steel, which may include further processing and/or a protective coating.

The handle portion 106A comprises a first end portion of the lock member 106. For example, in FIG. 7, the handle portion 106A is perpendicular or substantially perpendicular to the shaft portion 106B. The handle portion 106A forms a shorter part of the L-shape structure while the shaft portion 106B forms a longer part of the L-shape structure. In this example, the handle portion 106A is configured to be shorter than the shaft portion 106B. The handle portion 106A enables a user to manipulate (e.g., move, pull, push, rotate, etc.) the lock member 106 with ease to achieve the unlocked state and the locked state, respectively.

Figure 6A:
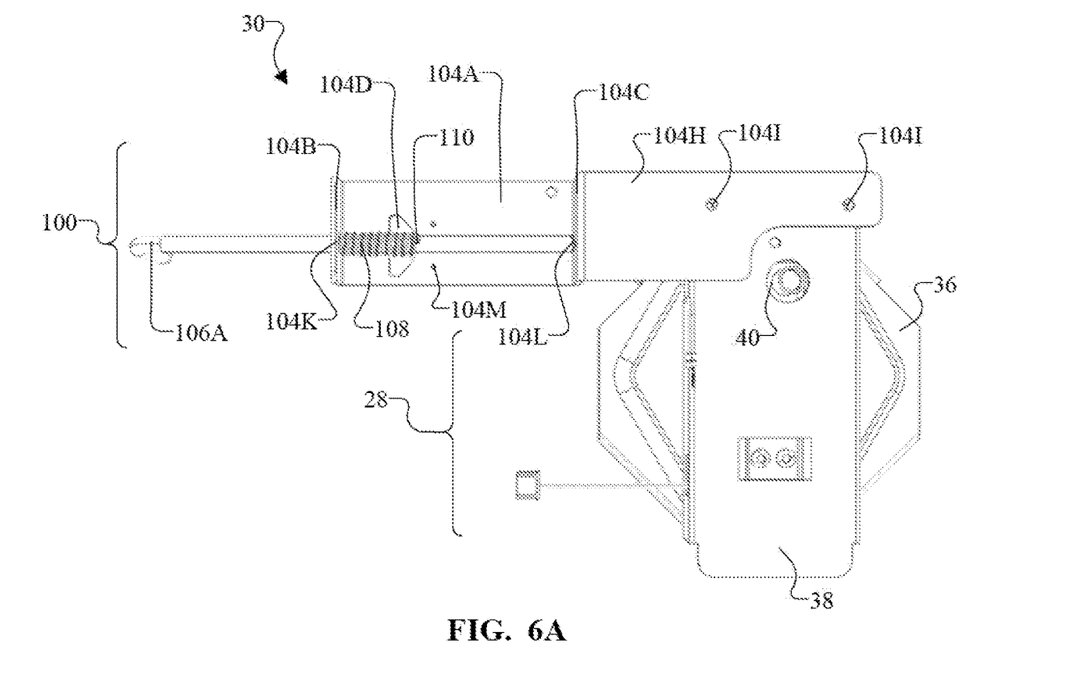
FIG. 6A is a bottom plan view of the scale assembly with the scale lock in the unlocked state according to an example embodiment of this disclosure.
Figure 6B:
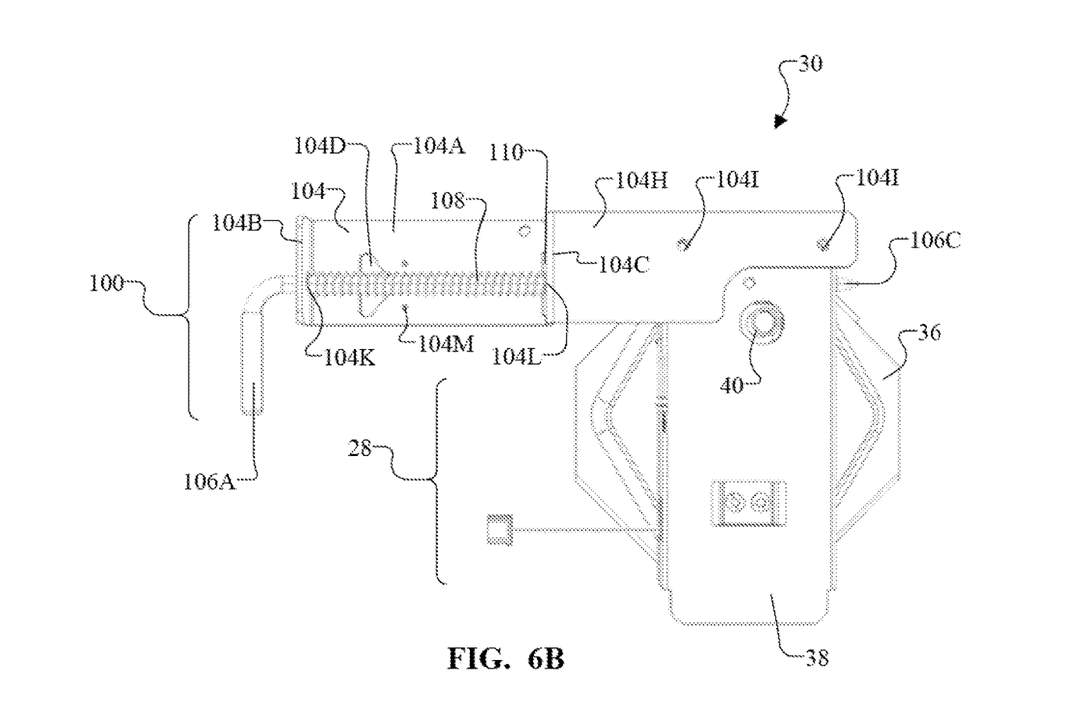
FIG. 6B is a bottom plan view of the scale assembly with the scale lock in the locked state according to an example embodiment of this disclosure.

The handle portion 106A is also advantageously configured to provide an indication of a state of the lock assembly 100 by its position and orientation. For example, as shown in at least FIG. 5A, when the lock assembly 100 is in the unlocked state, then a longitudinal axis of the handle portion 106A extends along and/or parallel to a first axis (vertical axis). Also, when in the unlocked state, the handle portion 106A extends above a bottom surface of the base 32 and on an outer side of a side surface of the base 32 (FIGS. 1 and 4A). More specifically, as shown in FIGS. 5A and 6A, the handle portion 106A is positioned at a greater distance from the first sidewall 104B of the bracket 104 when the lock member 106 is in the first position compared to when the lock member 106 is in the second position such that the handle portion 106A is exposed at the outer side of the side surface of the base 32. In this regard, the handle portion 106A is exposed with respect to the base assembly 18 to indicate that the lock assembly 100 is in the unlocked state with respect to the scale assembly 28. In contrast, as shown in at least FIG. 5B, when the lock assembly 100 is in the locked state, then the longitudinal axis of the handle portion 106A extends along a second axis (lateral axis), which is perpendicular to the first axis (vertical axis). Also, when in the locked state, the handle portion 106A is positioned below the bottom surface of the base 32 and on an inner side of the side surface of the base 32 (FIGS. 2 and 4B). More specifically, as shown in FIGS. 5B and 6B, the handle portion 106A is positioned at a lesser distance from the first sidewall 104B of the bracket 104 when the lock member 106 is in the second position compared to when the lock member 106 is in the first position such that the handle portion 106A is disposed on an inner side of the side surface of the base 32. In this regard, the handle portion 106A is protected and not exposed at a side surface of the base assembly 18 when the lock assembly 100 is in the locked state. When the handle portion 106A is not readily visible, then this position of the handle portion 106A indicates that the lock assembly 100 is in the locked state with respect to the scale assembly 28.

The shaft portion 106B comprises a second end portion of the lock member 106. For instance, in the example shown in FIG. 7, the shaft portion 106B is perpendicular or substantially perpendicular to the handle portion 106A. The shaft portion 106B forms a longer part of the L-shape structure while the handle portion 106A forms a shorter part of the L-shape structure. In this example, the shaft portion 106B is configured to be longer than the handle portion 106A. The shaft portion 106B is structured to engage with the lock component 102. More specifically, as shown in at least FIG. 7, the shaft portion 106B includes a tapered end portion 106C. This feature is advantageous in guiding the lock member 106 as the lock member 106 moves into or out of the through-holes (e.g., the through-holes of the lock component 102 and the through-holes of the scale base 38).

Figure 8A:
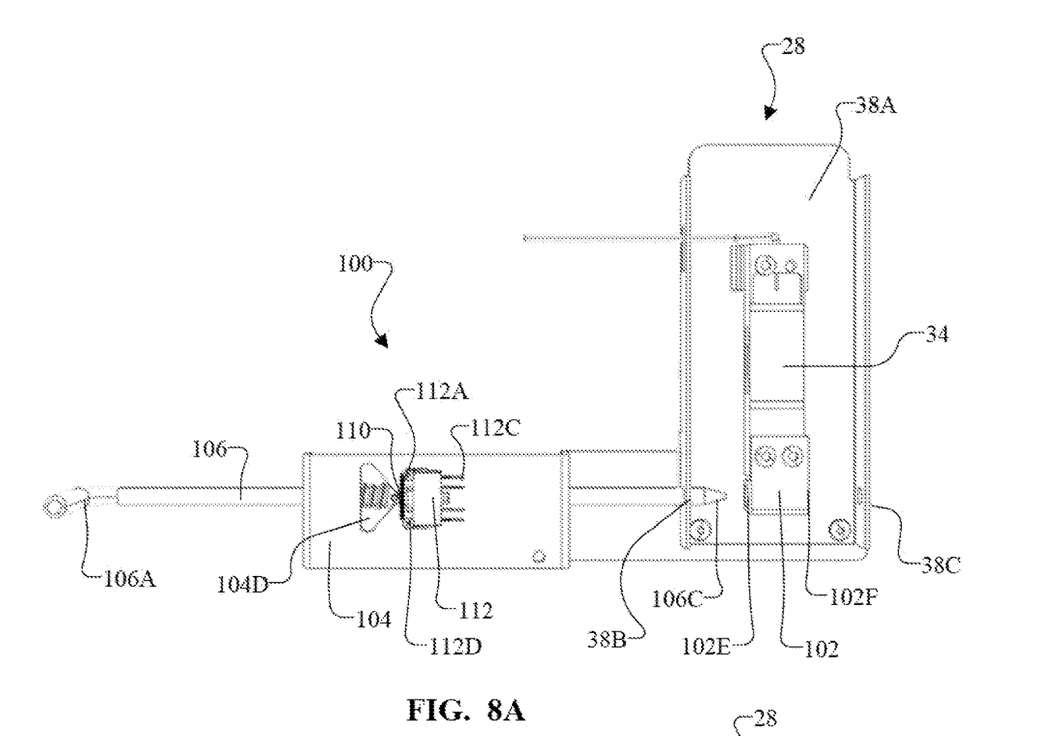
FIG. 8A is a top plan view of some parts of the scale assembly with the scale lock in the unlocked state according to an example embodiment of this disclosure.
Figure 8B:
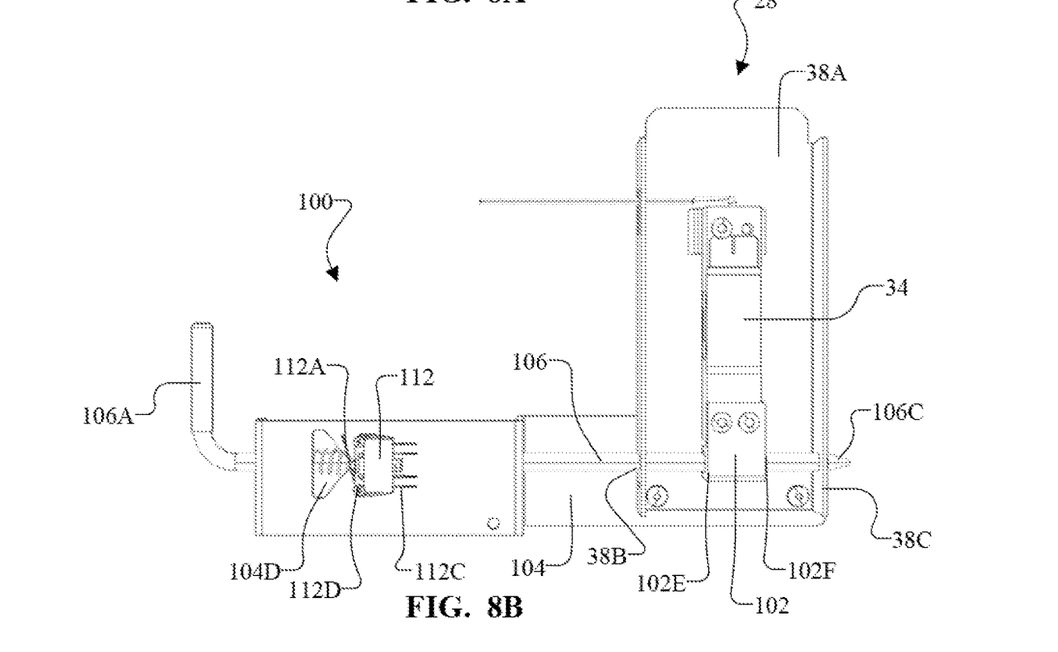
FIG. 8B is a top plan view of some parts of the scale assembly with the scale lock in the locked state according to an example embodiment of this disclosure.

FIGS. 8A and 8B provide top plan views of the lock assembly 100 with respect to the scale assembly 28 in which the scale platform 36 has been removed so that the interaction between the lock member 106 and the load cell 34 is visible. In this regard, the lock member 106 is configured to move into a first position to achieve the unlocked state with respect to the lock component 102. As shown in FIG. 8A, when the lock member 106 is in the first position, the shaft portion 106B is configured to be spaced from the lock component 102 such that the lock member 106 is disengaged from the lock component 102. More specifically, as shown in FIGS. 5A and 8A, the tapered end portion 106C is spaced from the end surface 102E of the lock component 102 when the lock member 106 is in the first position and the lock assembly 100 is in the unlocked state. Also, when the lock member 106 is in the first position as shown in FIG. 5A and FIG. 8A, the lock member 106 is engaged with and supported by the first sidewall 104B, the second sidewall 104C, and the first sidewall 38B. In this regard, when the lock component 102 is unsecured from the lock member 106, then the lock component 102 is free to move and thus the load cell 34 is physically enabled to operate.

Also, the lock member 106 is configured to move to a second position to achieve the locked state with respect to the lock component 102. More specifically, the tapered end portion 106C is configured to pass into one end surface 102E of the lock component 102 and out of the opposite end surface 102F of the lock component 102 as the lock member 106 moves into the second position. In this regard, the lock component 102 is configured to receive and surround a section of the shaft portion 106B of the lock member 106 so that the lock component 102 is held about the lock member 106. Also, when the lock member 106 is in the second position, as shown in FIG. 5B and FIG. 8B, the lock member 106 is supported by the first sidewall 104B and the second sidewall 104C of the bracket 104 while the lock member 106 contributes to a three-point locking mechanism for the load cell 34. That is, when the lock member 106 is in the second position, then the lock assembly 100 is configured to provide at least three points of contact for the lock member 106 to secure the load cell 34 that include (i) a first point at the first sidewall 38B, (ii) a second point at the locking component 102, and (iii) a third point at the second sidewall 38C. This three-point locking mechanism ensures that the load cell 34 is physically secured in a stable manner when the lock assembly 100 is in the locked state.

The shaft portion 106B is configured to carry the spring 108 or any suitable biasing device. More specifically, for instance, the shaft portion 106B is configured to support the spring 108 about its outer peripheral portion. For example, as shown in FIGS. 5A-5B and FIGS. 6A-6B, the coils of the spring 108 may wrap around the periphery of the shaft portion 106B of the lock member 106. In this example, the spring 108 is connected to the shaft portion 106B while being positioned between the first sidewall 104B and the pin 110. In this regard, the pin 110 is configured to affect a state of the spring 108 as the pin 110 moves towards or away from the first sidewall 104B. For example, the spring 108 is configured to be in a more compressed state when the lock member 106 is in the first position (compared to the second position) since the space for the spring 108 as defined by the distance between the first sidewall 104B and the pin 110 is reduced. The spring 108 is also configured to be in a less compressed state when the lock member 106 is in the second position (compared to the first position) since the space for the spring 108 as defined by the distance between the first sidewall 104B and the pin 110 is increased.

In addition, the shaft portion 106B is configured to carry the pin 110. In an example embodiment, the pin 110 is configured to extend perpendicular or substantially perpendicular to the shaft portion 106B in a secure manner. For example, in FIG. 7, the pin 110 is positioned to form a cross or cross-like structure with respect to the shaft portion 106B. This cross or cross-like structure is configured to ensure that the locking member 106 moves in a deliberate manner to transition from one state (e.g., unlocked state or locked state) to another state (e.g., locked state or unlocked state). For example, in order to move from the unlocked state to the locked state, the lock member 106 should be (i) pulled and rotated by 90 degrees to allow the pin 110 to escape from the larger region of the lock structure of the bracket 104 and (ii) pushed (e.g., via spring and/or user) into the second position. In this case, as an added benefit, the pin 110 is also configured to serve as a stopper by abutting against an inner portion of the second sidewall 104C to ensure that the lock member 106 is set properly at the second position so that the three-point locking mechanism is achieved. Also, in order to move from the locked state to the unlocked state, the lock member 106 should be (i) pulled out of the lock component 102 and (ii) rotated by 90 degrees to allow the pin 110 to move into the slot 104G of the bracket 104, thereby setting the lock member 106 in the first position.

Also, the pin 110 is configured to push against the spring 108 to transition the spring 108 into the more compressed state as the pin 110 moves towards the first sidewall 104B while transitioning into the unlocked state. For instance, FIG. 6A shows the position of the pin 110 when the lock member 106 is in the first position, as well as the more compressed state of the spring 108 when the lock assembly 100 is in the unlocked state. As shown in FIGS. 5A and 6A, the pin 110 is oriented along the first axis (vertical axis) and extends through the slot 104G while being held against an inner wall portion 104F. Also, when the pin 110 is within the slot 104G, the pin 110 is configured, via a biasing force of the spring 108, to be in contact with and/or push against the actuator 112A to activate the electrical switch 112. As shown in FIGS. 5A and 8A, for instance, the pin 110 is configured to cause the actuator 112A to be in a closed position, where the actuator 112A is parallel to (or substantially parallel to) and in full contact with (or predominately in contact with) a corresponding surface of the body 112B of the electrical switch 112. In this example, when pushed by the pin 110, the actuator is configured to push an internal switch 112E into the body 112B to activate the electrical switch 112.

The pin 110 is also configured to enable the spring 108 to return into the less compressed state as the pin 110 moves away from the first sidewall 104B while transitioning into the locked state. For instance, FIG. 6B shows the position of the pin 110 when the lock member 106 is in the second position, as well as the less compressed state of the spring 108 when the lock assembly 100 is in the unlocked state. As shown in FIGS. 5B and 6B, the pin 110 is oriented along the second axis (lateral axis) and is held against an inner side of the second sidewall 104C to hold the lock member 106 in the second position. Also, when the pin 110 is released from the lock structure of the bracket 104, then the pin 110 is spaced from the actuator 112A. As shown in FIGS. 5B and 8B, when there is space between the pin 110 and the actuator 112A, then the actuator 112A is configured to be in an open position, where the actuator 112A forms an acute angle with respect to the corresponding surface of the body 112B to provide space for the internal switch 112E to be released from the body 112B to deactivate the electrical switch 112.

In an example embodiment, the electrical switch 112 is configured to be secured to the bracket 104 at a location that is adjacent to the lock structure of the bracket, as shown in FIGS. 8A-8B. For example, the electrical switch 112 includes a connection portion with through-holes 112D, which are structured to receive mechanical fasteners. The mechanical fasteners are configured to fasten the electrical switch 112 to the bracket 104. The bracket 104 also has corresponding through-holes 104M (FIGS. 6A-6B) to receive these fasteners.

The electrical switch 112 includes an actuator 112A. In this example, the actuator 112A is a relatively thin bar of steel that is pivotally connected to the body 12B of the electrical switch 112. The actuator 112A is configured to move into a closed position when being acted thereupon and an open position when not being acted thereupon. For example, the actuator 112A is configured to move between a closed position when the lock assembly 100 is in the unlocked state and an open position when the lock assembly 100 is in the locked state. Also, the actuator 112A is configured to activate the electrical switch 112 when in the closed position and deactivate the electrical switch 112 when in the open position. The actuator 112A is configured to extend outward at an acute angle with respect to the corresponding surface of the body 112B of the electrical switch 112 when in the open position. Also, the actuator 112A is configured to extend parallel or substantially parallel to a corresponding surface of the body 112B of the electrical switch when in the closed position.

The actuator 112A is configured to be activated and deactivated, respectively, via the pin 110. When the actuator 112A is activated by being in contact with the pin 110 as the lock member 106 is in the first position, then the electrical switch 112 is configured to provide an electrical connection that enables the ACS unit 10 to power up such that power is supplied to the load cell 34. Alternatively, when the actuator 112A is deactivated by being spaced from the pin 110 as the lock member 106 is in the second position, then the electrical switch 112 disconnects the electrical connection and prevents the ACS unit 10 from powering up such that power is not supplied to the load cell 34 as a safeguard.

In addition, the electrical switch 112 includes a set of terminals 112C. For example, in FIGS. 8A-8B, the electrical switch 112 includes four terminals 112C. The set of terminals 112C are located on the electrical switch 112 in a non-interfering position with respect to the actuator 112A. In FIGS. 8A-8B, the set of terminals 112C are located on a side of the electrical switch 112 that is opposite to a side that includes the actuator 112A. The set of terminals 112C include a first subset of terminals 112C, which are configured to connect the electrical switch 112 to other electrical components of the ACS unit 10, such as an interlock relay and/or an electronic control board that controls various electrical components (e.g., the load cell 34) of the ACS unit 10. The set of terminals 112C further include a second subset of terminals 112C, which are connectable to a power source (e.g., power source of vehicle) and an electrical/electronic device to indicate a present state (e.g., locked state or unlocked state) of the lock assembly 100. For example, a user may connect a light (e.g., LED) to a terminal 112C so that the light is configured to exhibit an on-state when the lock assembly 100 is in the unlocked state and an off-state when the lock assembly 100 is in the locked state. More specifically, when the lock assembly 100 is the unlocked state, then the pin 110 activates the electrical switch 112 via the actuator 112A and completes the electrical connection to turn on the light. Alternatively, when the lock assembly 100 is in the locked state, then the pin 110 does not activate the electrical switch 112 via the actuator 112A and does not complete the electrical connection to turn on the light (i.e., the light is turned off). This feature is particularly advantageous, as the user is enabled to quickly check a status of the indicator (e.g., LED) to discern a state of the lock assembly 100 and determine whether the load cell 34 is protected or unprotected.

As discussed herein, the scale lock 30 includes a number of advantageous features, as well as benefits. For example, the scale lock 30 provides a robust solution for protecting the load cell 34 from various movements, vibrations, and/or forces that would otherwise jeopardize the integrity of the load cell 34. More specifically, the lock assembly 100 is advantageously configured to provide at least an (i) unlocked state in which the load cell 34 is physically unsecured and electrically enabled and (ii) a locked state in which the load cell 34 is physically secured and electrically disabled. In this regard, the lock assembly 100 is configured to physically and electrically protect the load cell 34 when in the locked state. Moreover, when in the locked state, the lock assembly 100 is advantageously configured to provide at least a three point locking mechanism to secure the load cell 34 in a stable manner. The three points may include tighter tolerance (e.g. less clearance for the movement of the lock member 106 compared to other points of the bracket 104) to provide a more secure connection for the load cell 34. In addition, the lock assembly 100 is also configured to enable the load cell 34 (and also the ACS unit 10) to operate as intended as if there were no scale lock 30 on the ACS unit 10 when in the unlocked state.

The lock assembly 100 includes the lock component 102, which is advantageously structured as an extension of the load cell 34 and which is configured to interact with a lock member 106. In addition, the lock assembly 100 includes a handle portion 106A, which enables a user to move the lock member 106 with relative ease to transition the lock assembly 100 into a desired state (e.g. unlocked state or locked state). Moreover, the lock assembly 100 is configured to position the handle portion 106A in an exposed and visible location when in the unlocked state and position the handle portion 106A in an unexposed and protected location when in the locked state. The positioning of the handle portion 106A makes it easy for a user to discern the state of the lock assembly 100. Also, the handle portion 106A and the pin 110 are configured to be parallel or substantially parallel to each other, thereby being advantageous in that an orientation of the handle portion 106A provides a user with an indication of the general orientation of the pin 110 (which may not be easily viewable). Also, the lock assembly 100 includes the bracket 104 with inner walls 104F, which is structured to guide the pin 110 into a proper orientation and a proper position in accordance with a moving direction of the lock member 106.

In addition, the lock assembly 100 includes a spring 108, which is advantageously configured to bias the lock assembly 100 to maintain its present state (e.g., unlocked state or locked state). For example, when the lock assembly 100 is in the unlocked state, the spring 108 is configured to push the pin 110 against an inner wall portion of the slot 104G of the lock structure and urge the pin 110 to return to the unlocked state even if some disturbance causes the lock member 106 to move out of place. As another example, when the lock assembly 100 is in the locked state, the spring 108 is configured to urge the lock member 106 to return to the locked state and maintain its position within the lock component 102 even if there is some small disturbance that causes the lock member 106 to move out of place. The biasing feature is advantageous in ensuring that the present state is maintained by the lock assembly 100 unless the lock member 106 is deliberately moved (e.g., pushed/pulled and rotated) by the user.

Furthermore, the lock assembly 100 is advantageous in being configured to notify a user of the present state (e.g., locked state or unlocked state) of the scale assembly 28. More specifically, for instance, the lock assembly 100 includes the electrical switch 112, which includes terminals 112C that enable the user to connect a status indicator, such as an electrical/electronic device (e.g., LED) to exhibit a first state (e.g. an on-state of the LED) when the lock assembly 100 is determined to be in the unlocked state and a second state (e.g., an off-state of the LED) when the lock assembly 100 is determined to be in the locked state. This notification feature is advantageous in informing the user of the present state of the lock assembly 100 especially when the user is not able to directly view the lock assembly 100. As a non-limiting example, for instance, a user may operably connect a light, associated with a vehicle, to the terminal of the electrical switch 112 such that the user can check a status of the light and thus the present state of the lock assembly 100 to ensure that the lock assembly 100 is in the locked state and the load cell 34 is physically and electrically protected before driving the vehicle.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, alternate embodiments include a magnet and magnetic sensor that are configured to activate and deactivate the electrical switch 112 instead of the pin 110 and physical actuator 112A. In this regard, for instance, the magnet may be secured to the lock member 106, the bracket 104, or any suitable part of the lock assembly 100 while the magnetic sensor may be secured to the bracket 104, the lock member 106, or any suitable part of the lock assembly 100. In these alternative embodiments, the lock assembly 100 is configured to activate the electrical switch 112 based on a first predetermined detection by the magnetic sensor and deactivate the electrical switch 112 based on a second predetermined detection by the magnetic sensor. Additionally or alternatively, for example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A lock assembly for a load cell, the lock assembly comprising:
   a lock component securable to the load cell;
   a lock member configured to move between at least (i) a first position such that the lock member is disengaged from the lock component to provide an unlocked state and (ii) a second position such that the lock member is engaged with the lock component to provide a locked state;
   a bracket configured to support the lock member in relation to the lock component;
   an electrical switch disposed on the bracket; and
   an actuator configured to interact with the electrical switch,
   wherein the actuator is configured to activate the electrical switch such that power is provided to the load cell only when the lock assembly is in the unlocked state.

2. The lock assembly of claim 1, further comprising:
   a pin connected to the lock member,
   wherein the pin is configured to be in contact with the actuator to activate the electrical switch such that power is provided to the load cell when the lock assembly is in the unlocked state.

3. The lock assembly of claim 1, further comprising:
   a pin connected to the lock member,
   wherein the pin is configured to be spaced from the actuator to deactivate the electrical switch and disconnect power to the load cell when the lock assembly is in the locked state.

4. The lock assembly of claim 1, further comprising:
   a pin connected to the lock member; and
   a spring configured to bias the lock member such that the pin is held against an inner wall of the bracket to hold the lock member in the first position when the lock assembly is in the unlocked state.

5. The lock assembly of claim 1, further comprising:
   a pin connected to the lock member,
   wherein the pin is positioned with respect to the lock member such that a longitudinal axis of the pin extends perpendicular to a longitudinal axis of a shaft portion of the lock member.

6. The lock assembly of claim 1, further comprising:
   a spring connected to the lock member,
   wherein the spring is configured to bias the lock member into the second position when the lock assembly is in the locked state.

7. A mobile service unit comprising:
   a base;
   a load cell supported on the base; and
   a lock assembly including:
      a lock component securable to the load cell;
      a lock member configured to move between at least (i) a first position such that the lock member is disengaged from the lock component to provide an unlocked state and (ii) a second position such that the lock member is engaged with the lock component to provide a locked state;
      a pin connected to the lock member, the pin being positioned with respect to the lock member such that a longitudinal axis of the pin extends perpendicular to a longitudinal axis of a shaft portion of the lock member; and a bracket secured to the base and structured to support lock member in relation to the lock component.

8. The mobile service unit of claim 7, wherein:
the lock assembly further includes an electrical switch disposed on the bracket; and
the lock assembly further includes an actuator configured to interact with the electrical switch,
wherein the actuator is configured to activate the electrical switch such that power is provided to the load cell only when the lock assembly is in the unlocked state.

9. The mobile service unit of claim 8, wherein:
the pin is configured to be in contact with the actuator to activate the electrical switch such that power is provided to the load cell when the lock assembly is in the unlocked state; and
the pin is configured to be spaced from the actuator to deactivate the electrical switch such that power is disconnected to the load cell when the lock assembly is in the locked state.

10. The mobile service unit of claim 9, wherein:
the pin is in contact with the actuator when the lock member is in the first position, and
the pin is spaced from the actuator when the lock member is in the second position.

11. The mobile service unit of claim 7, wherein the lock assembly further comprises:
a spring configured to bias the lock member such that the pin is held against an inner wall of the bracket to hold the lock member in the first position when the lock assembly is in the unlocked state.

12. The mobile service unit of claim 7, wherein:
the lock assembly further comprises a spring connected to the lock member; and
the spring is configured to bias the lock member into the second position when the lock assembly is in the locked state.

13. A mobile service unit comprising:
a base;
a load cell supported on the base; and
a lock assembly configured to selectively provide an unlocked state of the load cell and a locked state of the load cell, the lock assembly including:
a lock member configured to move between at least (i) a first position to provide the unlocked state and (ii) a second position to provide the locked state;
a bracket secured to the base, the bracket being configured to support the lock member;
an electrical switch secured to the bracket, the electrical switch being configured to connect power to the load cell when activated and disconnect power from the load cell when deactivated; and
an actuator configured to activate the electrical switch when the lock assembly is in the unlocked state and deactivate the electrical switch when the lock assembly is in the locked state.

14. The mobile service unit of claim 13, wherein:
the electrical switch includes a set of terminals that are operably connectable to an electrical device; and
the electrical device is configured to exhibit (a) a first state when the lock assembly is in the unlocked state and (b) a second state when the lock assembly is in the locked state.

15. The mobile service unit of claim 13, further comprising:
a pin connected to the lock member,
wherein,
the pin is configured to be in contact with the actuator in the unlocked state to activate the electrical switch, and
the pin is configured to be spaced from the actuator in the locked state to deactivate the electrical switch.

16. The mobile service nit of claim 13, wherein:
the lock assembly further comprises a lock component;
the lock component is securable to the load cell;
the lock member is configured to engage with the lock component such that the load cell is physically secured to the lock member when in the locked state; and
the lock member is configured to disengage from the lock component such that the load cell is physically unsecured to the lock member when in the unlocked state.

17. The mobile service unit of claim 16, further comprising:
a pin connected to the lock member; and
a spring configured to bias the lock member such that the pin is held against an inner wall of the bracket to hold the lock member in the first position when the lock assembly is in the unlocked state.

18. The mobile service unit of claim 13, wherein:
the lock assembly further comprises a spring; and
the spring is configured to bias the lock member into the second position.

* * * * *

UNITED STATES PATENT AND TRADEMARK OFFICE
CERTIFICATE OF CORRECTION

| | | |
|---|---|---|
| PATENT NO. | : 11,698,214 B2 | Page 1 of 1 |
| APPLICATION NO. | : 17/130707 | |
| DATED | : July 11, 2023 | |
| INVENTOR(S) | : Nielsen et al. | |

It is certified that error appears in the above-identified patent and that said Letters Patent is hereby corrected as shown below:

In the Claims

In Claim 16, at Column 16, Line 26: "mobile service nit" should read --mobile service unit--.

Signed and Sealed this
Tenth Day of October, 2023

Katherine Kelly Vidal
*Director of the United States Patent and Trademark Office*